(12) United States Patent
Leccese et al.

(10) Patent No.: US 12,263,728 B2
(45) Date of Patent: Apr. 1, 2025

(54) MOTOR VEHICLE SEAT

(71) Applicant: FERRARI S.p.A., Modena (IT)

(72) Inventors: Adriano Leccese, Modena (IT);
Rubens Curatola, Modena (IT);
Salvatore Sedda, Modena (IT)

(73) Assignee: FERRARI S.P.A., Modena (IT)

( * ) Notice: Subject to any disclaimer, the term of this patent is extended or adjusted under 35 U.S.C. 154(b) by 262 days.

(21) Appl. No.: 17/747,222

(22) Filed: May 18, 2022

(65) Prior Publication Data

US 2023/0019243 A1 Jan. 19, 2023

(30) Foreign Application Priority Data

Jul. 16, 2021 (IT) .......................... 102021000018917
Feb. 17, 2022 (IT) .......................... 102022000002945

(51) Int. Cl.
*B60J 7/22* (2006.01)
*B60N 2/20* (2006.01)
*B62D 35/00* (2006.01)

(52) U.S. Cl.
CPC ................ *B60J 7/223* (2013.01); *B60N 2/20* (2013.01); *B62D 35/007* (2013.01)

(58) Field of Classification Search
CPC .......... B60N 2/20; B60N 2/203; B60N 2/206; B60N 2/23; B60N 2/231; B60N 2/22; B60N 2/32; B60N 2/24; B62D 35/00; B62D 35/007; B60J 7/22; B60J 7/223
USPC ........................ 296/65.16, 17, 69, 85, 180.1; 297/343.13, 361.1, 13, 383, 354.1, 11, 297/362.11
See application file for complete search history.

(56) References Cited

U.S. PATENT DOCUMENTS 1,247,840 A * 11/1917 Jackman .............. B60N 2/3011
5/118
5,934,749 A * 8/1999 Pond ...................... B60N 2/663
297/483

(Continued)

FOREIGN PATENT DOCUMENTS

CN 201670131 U * 12/2010
DE 10121839 A1 * 11/2002 .............. B60J 7/223

(Continued)

OTHER PUBLICATIONS

Text CN 201670131 (Year: 2016).*

(Continued)

*Primary Examiner* — Dennis H Pedder
(74) *Attorney, Agent, or Firm* — CANTOR COLBURN LLP

(57) ABSTRACT

A motor vehicle seat includes a backrest portion a first body, a second body and a mechanism configured to coupled the backrest portion to the first body in a movable manner between a first position, in which the backrest portion is arranged between the first and the second body, the latter defining a base extending crosswise to the backrest portion in order to support a passenger seating with the back resting against the backrest portion on a first surface of the backrest portion, and a second position, in which the backrest portion has a second surface opposite the first surface and facing the second body; wherein the first surface, in the second position of the backrest portion, defines a wind deflector.

17 Claims, 5 Drawing Sheets

(56) References Cited

U.S. PATENT DOCUMENTS

| | | | | |
|---|---|---|---|---|
| 6,113,180 A | * | 9/2000 | Corporon | B62D 25/08 |
| | | | | 296/198 |
| 6,135,558 A | * | 10/2000 | Behrens | B60N 2/34 |
| | | | | 296/65.09 |
| 2012/0193949 A1 | | 8/2012 | Bernhard et al. | |
| 2015/0224007 A1 | * | 8/2015 | DeBraal | A61G 13/06 |
| | | | | 5/613 |

FOREIGN PATENT DOCUMENTS

| | | | | |
|---|---|---|---|---|
| FR | 2926253 A1 | | 7/2009 | |
| FR | 2986188 B1 | * | 3/2014 | B60J 7/223 |
| IT | 102021000018917 | | 7/2021 | |
| IT | 102022000002945 | | 2/2022 | |
| JP | 2015091712 A | * | 5/2015 | B60N 2/4228 |

OTHER PUBLICATIONS

Text JP2015-91712 (Year: 2015).*
DE10121839 Text (Year: 2002).*
FR2986188 Text (Year: 2013).*
Search Report for Italian Application No. 102021000018917, completed Mar. 21, 2022, 7 pages.
Search Report for Italian Application No. 202200002945, completed Oct. 13, 2022, 7 pages.

\* cited by examiner

MOTOR VEHICLE SEAT

CROSS-REFERENCE TO RELATED APPLICATIONS

This patent application claims priority from Italian patent applications no. 102021000018917 filed on Jul. 16, 2021, and no. 102022000002945 filed on Feb. 17, 2022, the entire disclosure of which is incorporated herein by reference.

TECHNICAL FIELD

The invention relates to a seat for a motor vehicle, in particular a convertible one.

PRIOR ART

Convertible motor vehicles notoriously suffer, in the configuration with open roof, from the annoying presence of air draughts and whirlwinds inside the passenger compartment.

The aforesaid undesired phenomenon is further worsened when the motor vehicle travels at relatively high speeds, for example along suburban paths or on a motorway.

In order to counter this phenomenon, the use of a suitable wind deflector is known, which is mounted on the rear body in a position at the back of the passenger compartment and with a vertical orientation or anyway transverse to the ground.

The wind deflector is removable for those cases in which its use is not necessary; therefore, the vehicle is typically provided with a storage compartment designed to easily accommodate the wind deflector, which was removed and—if necessary—folded onto itself, in case of a pliable wind deflector.

Generally speaking, an improvement of the state of the art in the automotive industry is needed, specifically for convertible motor vehicles.

More in particular, the free spaces of the motor vehicle need to be redistributed, assigning at least part of the space needed to accommodate the wind deflector to other uses or, simply, to an increase in the passengers' comfort in the passenger compartment.

Furthermore, the operations to be carried out to install and position the wind deflector, when it needs to be used, and to remove and store the wind deflector, when the use thereof is no longer needed, need to become easier.

The object of the invention is to fulfil at least one of the needs discussed above, preferably in a simple and effective fashion.

DESCRIPTION OF THE INVENTION

Said object is reached by a motor vehicle seat as defined in claim 1.

The dependent claims define special embodiments of the invention.

BRIEF DESCRIPTION OF THE DRAWINGS

Hereinafter, an embodiment of the invention will be described, in order to allow the latter to be better understood, by way of non-limiting example and with reference to the accompanying drawings, wherein.

EMBODIMENTS OF THE INVENTION

Figure 1:
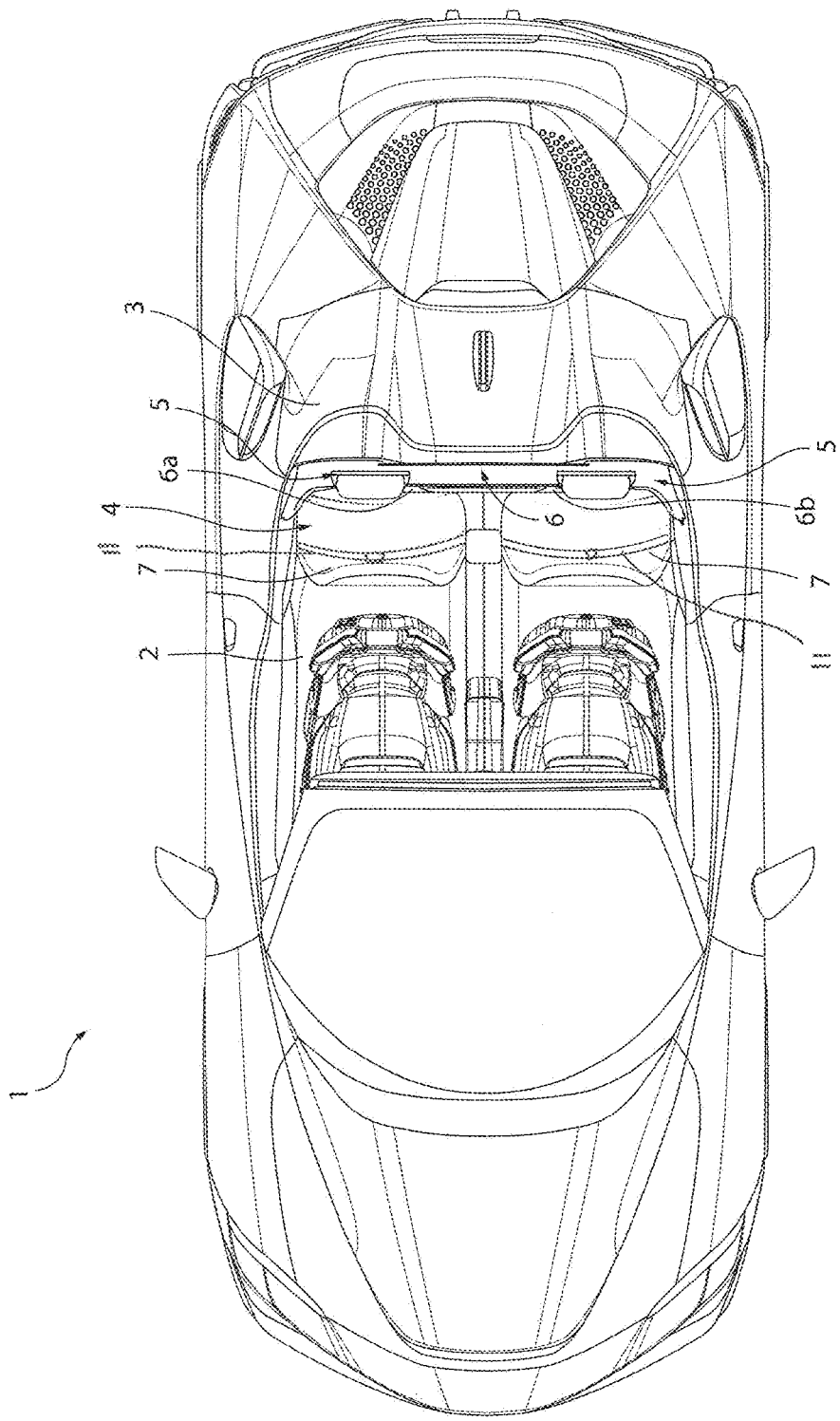
FIG. 1 is a plan view of a convertible motor vehicle comprising a motor vehicle seat according to an embodiment of the invention.

In FIG. 1, reference number 1 is used to indicate, as a whole, a motor vehicle. More precisely, the motor vehicle 1 is a convertible motor vehicle.

Hence, the motor vehicle 1 comprises a passenger compartment 2 and a roof 3, which can be configured between an open configuration, in which the passenger compartment 2 is open to the outside, and a closed configuration to close the passenger compartment 2, in particular when all the other openings of the motor vehicle 1 are closed (for instance, windows, openings of the doors or of the trunk).

According to an alternative, the passenger compartment 2 could always be open to the outside; in other words, the motor vehicle 1 could lack the roof 3.

Furthermore, the motor vehicle 1 comprises a seat 4, in particular a rear seat, more in particular a seat for several people, precisely a seat for two people.

The seat 4 comprises a plurality of bodies or portions 5, 6, 7, the portion 6 defining at least a backrest portion, specifically the entire backrest.

In other words, the backrest defined by the potion 6 is shared by all users of the seat 4.

Regardless of that, each one of the portions 5, 7 may be, for example, fixed.

In particular, the portion 5 comprises a headrest 5a and a base 5b arranged between the portion 6 and the headrest 5a, namely under the headrest 5a, precisely immediately under it.

The portion 7 extends along the forward moving direction of the motor vehicle 1, namely along a horizontal direction, thus defining a base of the seat 4 suited to support the legs of a passenger seating on the seat 4.

Specifically, the portion 7 is concave upwards so as to increase the comfort of the passenger seating on the seat 4.

Furthermore, the seat 4 comprises a mechanism 8 configured to couple the portion 6 to the portion 5 in a movable manner between a first and a second position.

Figure 2:
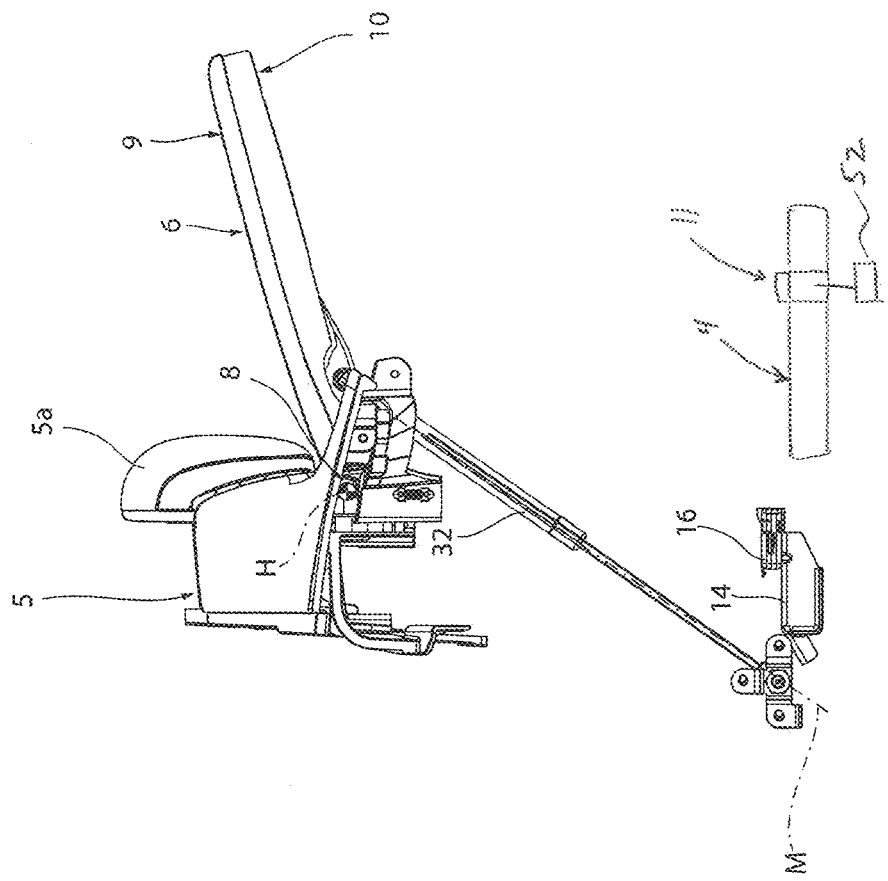
FIG. 2 is a rotated side view of the backrest portion and seat, with parts removed for greater clarity.

In the first position, shown in FIG. 2, the portion 6 is arranged between the portions 5, 7, is transversal to the portion 7 and, more precisely, forms with the portion 7 an angle ranging from 92° to 102°, preferably equal to approximately 98°. In other words, the portion 6 forms an angle, relative to a vertical plane, ranging from 2° to 12°, preferably equal to circa 8°. In this position, the seat 4 is suitable for supporting the passenger seating with the lower limbs resting against the portion 7 and the back resting against the portion 6 in the area of a surface 9 of the portion 6 itself.

In the first position, the portion 6 and the portion 5 form a substantially zero angle. Generally speaking, in this description, when dealing with the angles formed between the portions 5, 6, 7, the portions 5, 6, 7 themselves are treated, for the sake of simplicity, with reference to planes along which they extend or to which they are tangent, despite the portion 5, 6, 7 not being perfectly flat. As a matter of fact, the portions 5, 6, 7 are substantially flat, in that they can anyway have slightly convex or concave surfaces, with relatively large radii of curvature, for example greater than twice the height extension of the portion 6, when it is arranged in the first position.

In the second position, the portion 6 extends along the horizontal direction above the portion 7. In other words, the portion 6 has a surface 10 opposite the surface 9 and facing the portion 7.

More precisely, in the second position, the portion 5 and the portion 6 form an angle ranging from 70° to 80°, preferably equal to 75°. This means that an ideal or real rotation made by the portion 6 from the first to the second position ranges from 100° to 110° and is preferably equal to circa 105°.

Figure 3:
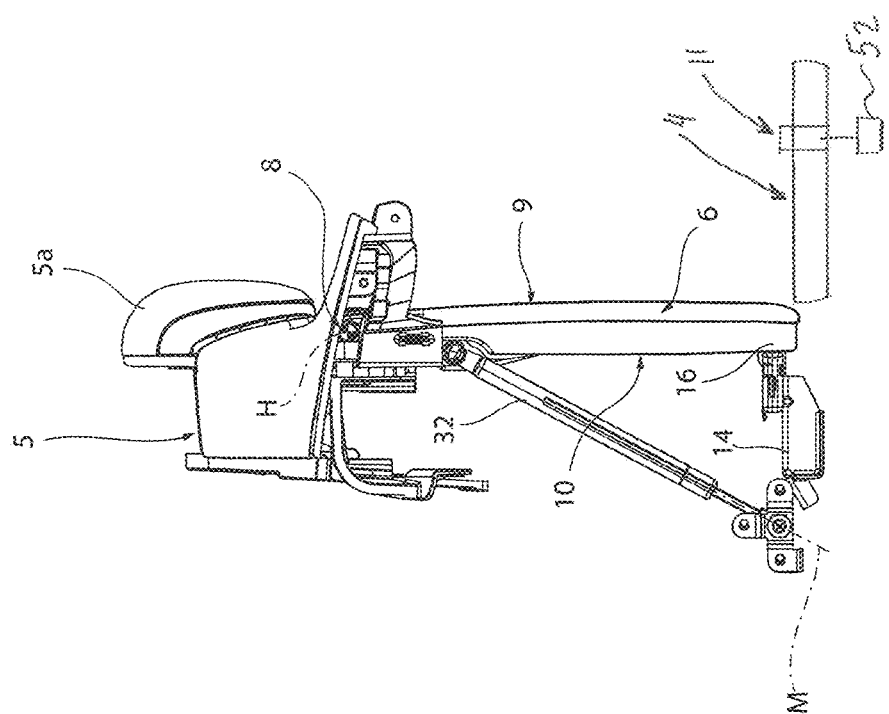
FIG. 3 is rotated view similar to FIG. 2 and shows the backrest portion and seat in an operating condition distinct from the one of FIG. 2.
Figure 4:
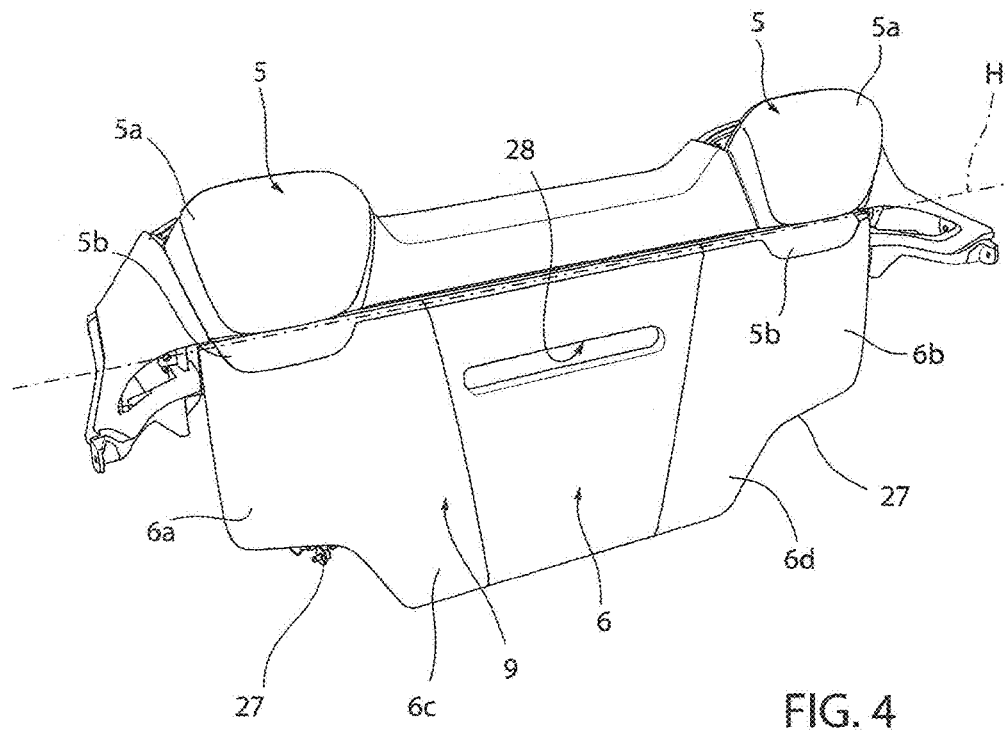
FIGS. 4 and 5 are perspective views of the seat, on a larger scale and according to different points of view.

In the second position, shown in FIG. 3, the portion 6 becomes a wind deflector, at least when the roof 3 is in the open configuration. Namely, the portion 6 deflects an air flow directed towards the passenger compartment 2 towards the outside. More precisely, the air flow starts from a rear area of the motor vehicle 1 towards the passenger compartment 2. Here, the air flow meets the portion 6 in the second position brushing the surface 9, which is designed to support the back of the passenger in the first position.

In particular, the portion 6, in the second position, is tilted upwards relative to the horizontal direction, more in particular at an acute angle.

Figure 6:
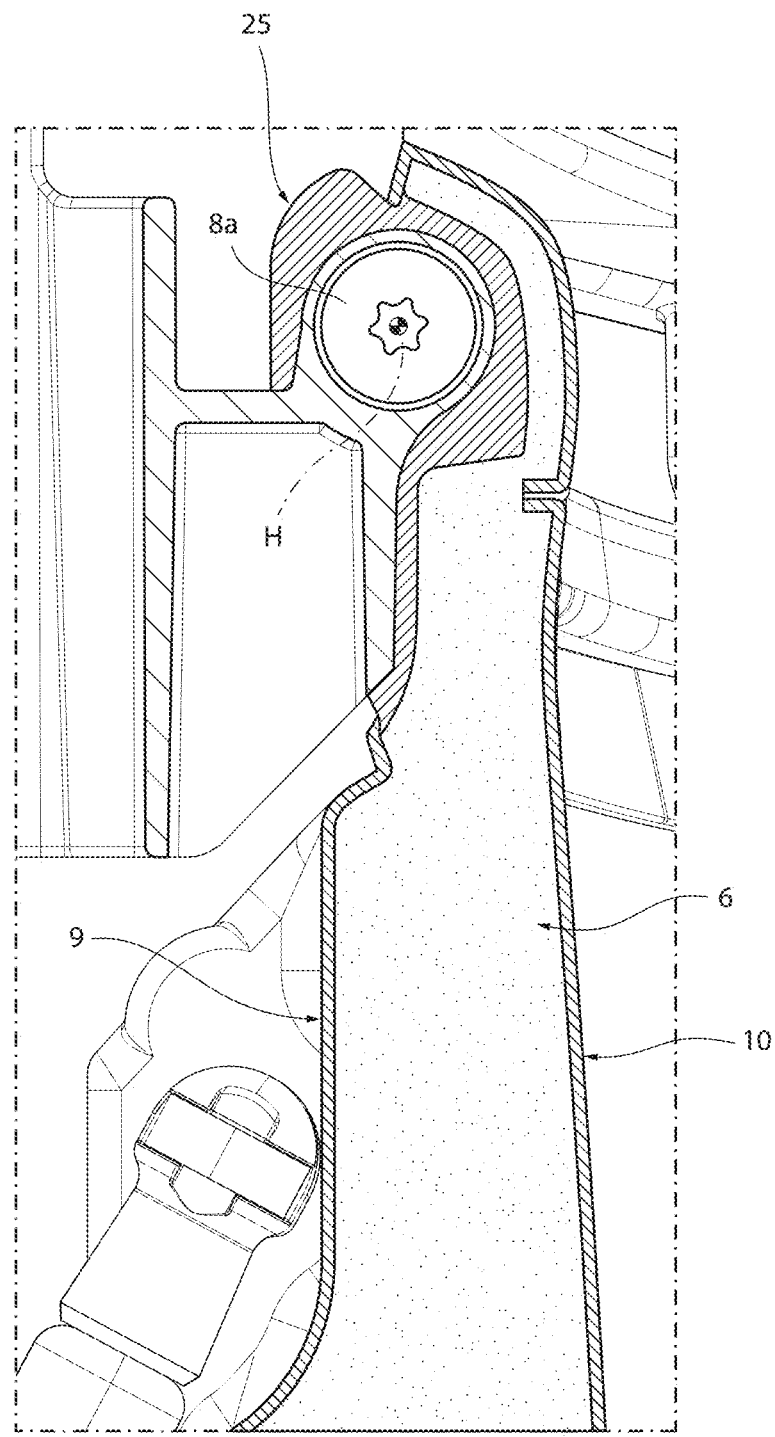
FIGS. 6 and 7 are cross sections of the seat according to respective planes distinct from and parallel to one another, on a further larger scale.

More in detail, as shown in FIG. 6, the mechanism 8 comprises a hinge 25, through which the portion 6 is hinged to the portion 5 in a rotary manner in order to rotate around an axis H between the first and the second position. In particular, the axis H is horizontal and orthogonal to the forward moving direction of the motor vehicle 1. More in particular, the axis H extends in the area of the base 5b.

Specifically, the potion 6 is hinged at the base 5b by means of the hinge 25.

More specifically, the hinge 25 comprises a pin 8a supported by the base 5b in a rotary manner. In particular, the pin 8a extends along the axis H, more in particular under the headrest 5a.

According to the embodiment shown herein, an end 6a of the portion 6 is hinged to a stationary headrest support 50 (as more clearly shown in FIG. 5) of the portion 5 through the hinge 25.

The portion 6 extends along the axis H from the end 6a to the an end 6b.

Preferably, like the end 6a, the end 6b is arranged between a further portion 5 and a further portion 7 of the seat 4, preferably equal to the previous ones. Like the end 6a, the end 6b is hinged to the further portion 5 by means of a further hinge (not shown, for example like the hinge 25) of the mechanism 8 around the axis H. Specifically, said further hinge comprises a further pin (not shown, for example like the pin 8a) supported in a rotary manner by a corresponding base 5a of the further portion 5, which also comprises a headrest 5a above the base 5b. In particular, the further pin extends along the axis H, more in particular under the corresponding headrest 5a.

The hinge 25 and the further hinge are redundant since they both hinge the portion 6 to the portion 5 around the same axis H; therefore, they can be interpreted as one single hinge device or as parts of one single hinge, of which the mechanisms 8 preferably consists.

Conveniently, the portion 6 comprises two more ends 6c, 6d opposite the ends 6a, 6b, respectively, according to directions orthogonal to the axis H.

In other words, the portion 6 extends orthogonally to the axis H and ends with an end portion, which comprises the ends 6c, 6d opposite one another according to the axis H.

The ends 6c, 6d have respective recesses 27, in particular with an arched shape or ear-shaped, towards the axis H or the centre of the portion 6. The recesses 27 are meant relative to an ideal rectangle that circumscribes the portion 6 and has, more in particular, sides overlapping edges of the ends 6a, 6b, the edges being transversal to the axis H. Specifically, the recesses 27 would be located at the corners of the rectangle, on the opposite side relative to the axis H.

Advantageously, the portion 6 has a through slot 28 to define an air intake. The term "slot" identifies an opening with a closed outline. More in detail, the slot 28 is arranged in a central position of the portion 6 according to the axis H.

In particular, the slot 28 extends according to the axis H with a width ranging from one third to one fourth of a maximum width of the portion 6 along the axis H. Furthermore, more in particular, transversally to the axis H, the slot 28 extends along less than one third of the width thereof.

Again transversally to the axis H, more precisely, the slot 28 is located in the half of the portion 6 closer to the axis H. Even more precisely, the slot 28 is located in an area defined between one and three eighths of a maximum length of the portion 6 orthogonally to the axis H.

Figure 7:
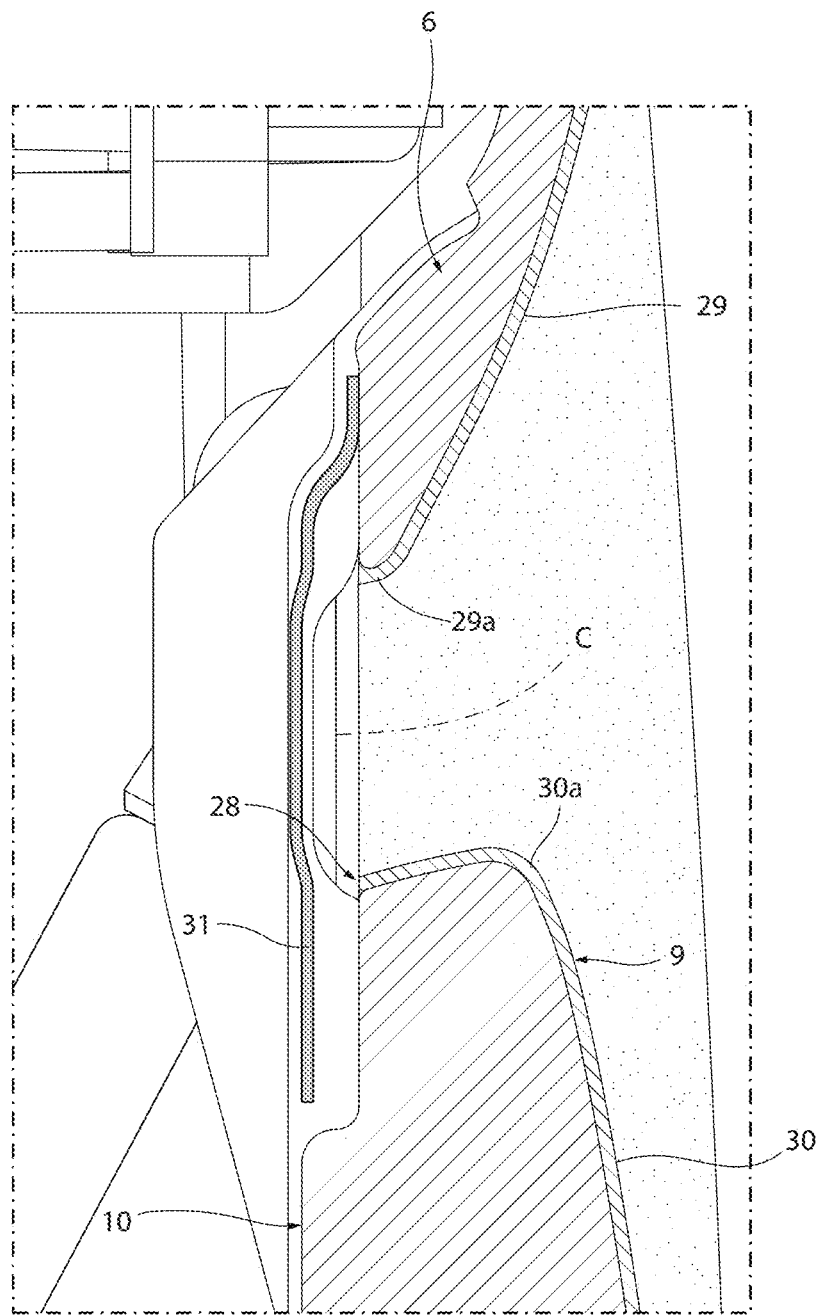

FIG. 7 shows a cross section of the portion 6 according to an ideal plane orthogonal to the axis H in the area of the slot 28, so as to show the shape of the slot 28 more in detail.

The intersection of the surface 9 with the plane of the cross section defines curves 29, 30, which specifically are closer and farther, respectively, relative to the axis H at opposite sides of the slot 28, transversally to the axis H.

The curves 29, 30 comprise respective bent or concave segments 29a, 30a at an inlet of the slot 28; in particular, the segments 29a, 30a have respective concavities towards the axis H and according to a direction leading away from the axis H. More in general, the concavities face opposite sides of the slot 28.

Preferably, the curvature of the segment 29a is narrower than the one of the segment 30a. However, the contrary is anyway possible, without losing in generality.

The curves 29, 30 form a channel for the passage of air through the slot 28.

In particular, the channel extends along a curved axis C with a concavity facing the axis H.

Alternatively or in addition, the channel is converging, more specifically slightly converging.

Preferably, the seat 4 also comprises a mesh 31 to screen the slot 28, though allowing air to flow through the slot 28. The mesh 31 is fixed relative to the portion 6, more precisely fixed to the latter, even more precisely at the surface 10.

For example, the mesh 31 is fixed to the portion 6 by means of a releasable fixing device, in particular comprising known threaded members, which are not shown herein.

The mesh 31 is arranged so as to cover the entire slot 28.

Specifically, the mesh 31 is rigid and, for example, is a metal mesh.

Preferably, the seat 4 comprises one or more springs, more precisely two springs 32, which couple the portion 6 to a frame portion 14 of the seat 4 or of the motor vehicle 1 in a resilient manner. Specifically, the frame portion 14 is fixed.

Furthermore, the seat 4 comprises a locking device 16, which is configured to fix the portion 6 to the frame portion 14 with the portion 6 in the first position. For example, the locking device 16 can be closed in a snapping manner.

The locking device 16 is releasable, in particular by means of an electric command, for example emitted by a control unit 52 of the seat 4 or of the motor vehicle 1 as is generally shown in FIGS. 2 and 3.

In this specific case, the motor vehicle 1 or the seat 4 comprises a command device, which is not shown herein and can be operated by the passenger in order to cause the control unit to emit the electric command to release the locking device 16.

This is not limiting, since the locking device 16 could be releasable, alternatively or in addition, by means of a manual control, according to variants which are not shown herein.

Preferably, the control unit is configured to detect whether a safety belt 11 as shown in FIG. 1 associated with or coupled to the seat 4 is fastened and to inhibit the emission of the electric command when it detects that the safety belt is fastened The springs 32 are pre-loaded so as to automatically move the portion 6 from the first to the second position, when the locking device 16 is released.

Furthermore, the springs 32 are configured to hold the portion 6 in the second position, reacting to loads exerted upon the portion 6 by air flows deflected by the portion 6.

Namely, the springs 32 are sufficiently stiff to limit or even cancel the vibrations of the portion 6 due to the air flows deflected by the portion 6.

The portion 6 can manually be moved back to the first position by pushing the portion 6 against the resistance action of the springs 32.

Preferably, the springs 32 extend along straight axes M, in particular incident to the portion 6. The springs 32 have respective ends fixed to the portion 6, in particular in the area of the surface 10. The other opposite ends of the springs 32 along the axes M are fixed to the frame portion 14.

Specifically, the axes M form, with the portion 6, an angle ranging from 20° to 40°.

Figure 5:
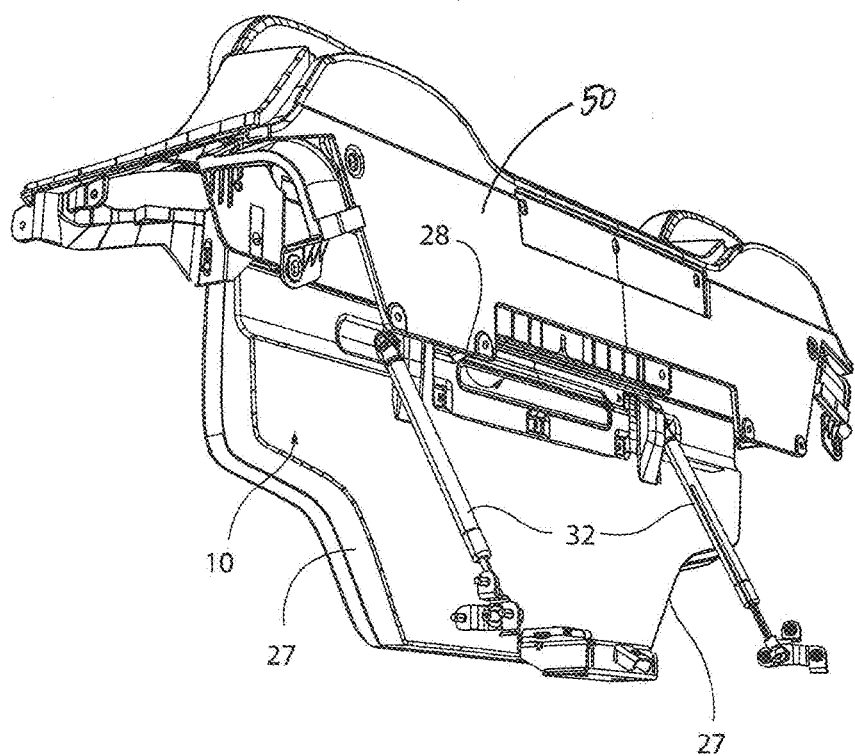

Furthermore, the springs 32 are applied to the portion 6 at application points, better visible in FIG. 5 and, in particular, arranged in the area between one and three eighths of the maximum length of the portion 6, crosswise to the axis H and starting from the axis H.

According to the axis H, each one of the application points of the springs 32 is located at a distance from the centre of the portion 6 ranging from one sixteenth to one fourth of the maximum width of the portion 6, more preferably from one eighth and one fourth of the maximum width.

According to the axis H, the application points are preferably located at the same distance orthogonal to the axis H and, more in particular, in symmetrical positions relative to the centre of the portion 6.

In particular, the springs 32 are fluid springs, more precisely gas springs.

Therefore, the springs 32 also introduce a damping to the movement of the portion 6, in particular to the rotary movement thereof around the axis H.

The frame portion 14 extends behind the seat 4 and, hence, behind the portion 6, both in the first and in the second position. Namely, the frame portion 14 extends on the opposite side of the portion 7 relative to the portion 6 in the first position.

Preferably, the portion 6 in the first position defines at least one wall of a trunk of the motor vehicle 1.

In the second position, the portion 6 frees a space between the portion 5 and the frame portion 14, such as to allow objects to be moved from the front of the seat 4 to the back thereof.

In the operation of the seat 4 starting from the first position, the passenger releases the locking device 16 by means of the aforesaid command device. By so doing, the springs 32 are released and move the portion 6 to the second position, where it defines a wind deflector to deflect air flows coming from the outside of the motor vehicle 1 towards the inside of the motor vehicle 1, obviously with the roof 3 in the open configuration.

Owing the above, the advantages of the seat 4 according to the invention are evident.

The seat 4 is multiuse, in that it can be used both as a seat and as a wind deflector; in this way, no removable wind deflector is needed and no storage compartment is needed to accommodate the wind deflector when it is not used. This corresponds to significant reduction in the space taken up in the motor vehicle 1.

Furthermore, the use of the seat 4 as wind deflector is extremely simple. Users only have to move the portion 6 to the second position, for example releasing the locking device 16 and waiting for the springs 32 to automatically move the portion 6 to the second position.

Here, if necessary, users can fix the second position of the portion 6 to a component of the motor vehicle 1, for example through a further locking device which is not shown herein.

Furthermore, the portion 6 in the second position also allows for a communication between the front of the seat 4 and the back thereof in a simple fashion. In this way, the space of the trunk can be increased, for example in order to introduce large-sized objects and retrieve or store objects starting from the passenger compartment 2.

The slot 28 is an effective air intake to improve the aerodynamics of the portion 6 when it acts as wind deflector, namely in the second position. Indeed, the slot 28 is configured so as to reach an ideal compromise between avoiding return air flows from the outside towards the passenger compartment 2 and decreasing the loads exerted upon the portion 6 by the deflected air flows. The shape, the arrangement and the dimension of the slot 28 all contribute, both independently and together, with a bonus effect, to the achievement of the ideal compromise.

Furthermore, the points of application of the springs 32 are arranged in an ideal manner in order to allow passengers to move the portion 6 back to the first position with a very small effort, in particular equal to a predetermined target effort.

At the same time, the springs 32 are sufficiently stiff to offer a resistance that is such as to prevent the portion 6 from returning from the second position to the first position due to the deflected air flows.

In addition, the fact that the springs 32 contain fluids, in particular gas and oil, for they are gas springs, introduces a damping that gives fluidity to the movements of the portion 6, in particular from the first to the second position.

The recesses 27 encourage the rotary movement of the portion 6 from the first to the second position, without interfering with other parts of the motor vehicle 1, especially with the front seats.

Finally, the seat 4 according to the invention can be subjected to changes and variants, which, though, do not go beyond the scope of protection set forth in the appended claims.

In particular, the number of each one of the components described and shown herein could be different.

Furthermore, the springs 32 and the locking device 16 can be independent of one another; in other words, the presence of the springs 32 does not imply the presence of the locking device 16 and vice versa.

The invention claimed is:

1. A motor vehicle seat comprising:
a backrest portion, a seat portion and a stationary headrest support, wherein the backrest portion has a first surface to support a back of a seated passenger, a second surface opposite the first surface, a first end carried by the stationary headrest support and a second free end, wherein the backrest portion is movable by means of a mechanism so that the backrest portion is rotatable between a first position and a second position, wherein the backrest portion in the first position is vertically arranged relative to ground between the stationary headrest support and the seat portion so as to extend transversely relative to the seat portion, the backrest portion in the first position is configured for supporting the back of a passenger resting against the backrest portion on the first surface of the backrest portion, wherein the backrest portion in the second position has the second surface facing the seat portion and is tilted upwards so that the second end has a higher altitude than the first end relative to ground; wherein the backrest portion in the second position operates as a wind deflector for a convertible vehicle.

2. The seat according to claim 1, wherein the mechanism comprises at least one hinge, through which the backrest portion is hinged to the stationary headrest support in the rotatable manner around an axis between the first and the second position.

3. The seat according to claim 2, wherein the stationary headrest support further comprises a headrest.

4. The seat according to claim 1, comprising a frame portion and a locking device configured to fix the backrest portion to the frame portion with the backrest portion in the first position.

5. The seat according to claim 4, wherein the locking device is releasable; the seat comprising at least one spring, which couples the backrest portion to the frame portion in a resilient manner and is pre-loaded so as to automatically move the backrest portion from the first to the second position when the locking device is released.

6. The seat according to claim 5, wherein the spring (32) extends along a straight axis between two opposite ends fixed to the backrest portion and to the frame portion, respectively.

7. The seat according to claim 5, further comprising a control unit configured to emit an electric command through which the locking device is released and to detect whether a safety belt associated with the seat is fastened, so that the control unit is further configured to inhibit an emission of the electric command when the control unit detects that the safety belt is fastened.

8. The seat according to claim 2, wherein the backrest portion extends orthogonally to the axis ending with an end portion comprising two further ends opposite one another according to the axis, said further ends having respective recesses towards said axis or towards a centre of the backrest portion.

9. The seat according to claim 1 and comprising a through slot to define an air intake.

10. The seat according to claim 9, wherein an ideal plane transverse or orthogonal to the first surface at the slot intersects the first surface defining two curves.

11. The seat according to claim 10, wherein the curves comprise respective bent segments at an inlet of the slot; the bent segments having respective concavities facing opposite sides of the slot, wherein the concavity of one of the bent segments is narrower than the concavity of the other one of the bent segments.

12. The seat according to claim 10, wherein the curves form a converging channel for the passage of air through the slot.

13. A motor vehicle comprising a seat according to claim 1.

14. The motor vehicle according to claim 13, further comprising:
a roof that can be configured between an open configuration, in which the passenger compartment is open to the outside, and a closed configuration to close the passenger compartment,
wherein said wind deflector is configured to deflect an air flow directed towards the passenger compartment towards the outside when the roof is in the open configuration and the backrest portion is in the second position.

15. The motor vehicle of claim 13, wherein the seat (4) according to claim 1 is configured in the motor vehicle as the wind deflector.

16. The seat according to claim 5, wherein the at least one spring is a fluid spring.

17. The seat according to claim 5, wherein the at least one spring is a gas spring.

* * * * *